US011109314B2

United States Patent
Cao et al.

(10) Patent No.: US 11,109,314 B2
(45) Date of Patent: Aug. 31, 2021

(54) PADDING FOR WAKEUP RADIO (WUR) PACKETS

(71) Applicant: Marvell World Trade Ltd., St. Michael (BB)

(72) Inventors: Rui Cao, Fremont, CA (US); Hongyuan Zhang, Fremont, CA (US); Liwen Chu, San Ramon, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 6 days.

(21) Appl. No.: 16/670,893

(22) Filed: Oct. 31, 2019

(65) Prior Publication Data

US 2020/0137686 A1 Apr. 30, 2020

Related U.S. Application Data

(60) Provisional application No. 62/753,619, filed on Oct. 31, 2018.

(51) Int. Cl.
*H04W 52/02* (2009.01)
*H04L 1/00* (2006.01)
*H04L 27/02* (2006.01)
*H04W 84/12* (2009.01)

(52) U.S. Cl.
CPC ....... *H04W 52/0229* (2013.01); *H04L 1/0008* (2013.01); *H04L 27/02* (2013.01); *H04W 84/12* (2013.01)

(58) Field of Classification Search
CPC ............. H04W 52/0229; H04W 84/12; H04L 1/0008; H04L 27/02
USPC .......................................................... 370/329
See application file for complete search history.

(56) References Cited

U.S. PATENT DOCUMENTS

| | | | |
|---|---|---|---|
| 2014/0112225 | A1 | 4/2014 | Jafarian et al. |
| 2015/0208349 | A1 | 7/2015 | Ramamurthy et al. |
| 2016/0366644 | A1 | 12/2016 | Ghosh et al. |
| 2016/0374020 | A1 | 12/2016 | Azizi et al. |
| 2017/0094600 | A1 | 3/2017 | Min et al. |

(Continued)

FOREIGN PATENT DOCUMENTS

| | | |
|---|---|---|
| CN | 107800526 A | 3/2018 |
| WO | WO-2018/032774 A1 | 2/2018 |

OTHER PUBLICATIONS 62628293P (provisional application) (Year: 2018).*

(Continued)

*Primary Examiner* — Yemane Mesfin
*Assistant Examiner* — Intekhaab A Siddiquee

(57) ABSTRACT

A communication device in a wireless local area network (WLAN) generates a first portion of a wakeup radio (WUR) packet and a second portion of the WUR packet. The first portion of the WUR packet corresponds to a WLAN legacy physical layer (PHY) preamble. Generating the second portion of the WUR packet includes: generating the second portion of the WUR packet to include a WUR packet PHY sync signal. The WUR packet PHY sync signal corresponds to a sync bit sequence with each bit in the sync bit sequence modulated by a sync waveform. The second portion of the WUR packet is generated to also include a PHY data portion and a padding signal. The padding signal corresponds to a padding bit sequence with each bit in the padding bit sequence modulated by the sync waveform. The communication device transmits the WUR packet in the WLAN.

20 Claims, 7 Drawing Sheets

(56) References Cited

U.S. PATENT DOCUMENTS

| | | | |
|---|---|---|---|
| 2017/0111858 A1 | 4/2017 | Azizi et al. | |
| 2018/0019902 A1 | 1/2018 | Suh et al. | |
| 2018/0020405 A1 | 1/2018 | Huang et al. | |
| 2018/0184379 A1 | 6/2018 | Liu et al. | |
| 2018/0206192 A1 | 7/2018 | Vermani et al. | |
| 2018/0376370 A1 | 12/2018 | Shellhammer et al. | |
| 2019/0028968 A1 | 1/2019 | Mu et al. | |
| 2019/0082385 A1 | 3/2019 | Shellhammer et al. | |
| 2020/0322889 A1* | 10/2020 | Chitrakar | H04W 84/12 |
| 2020/0367157 A1* | 11/2020 | Kim | H04W 52/02 |

OTHER PUBLICATIONS 62616274P (provisional application) (Year: 2018).*

IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Park et al., "Proposal for Wake-Up Receiver (WUR) Study Group," IEEE Draft 802.11-16/0722r1, 14 pages (May 18, 2016).

International Search Report and Written Opinion in International Patent Application No. PCT/US2019/059225, dated Feb. 7, 2020 (10 pages).

IEEE P802.11ba™/D1.0, Draft Standard for Information technology—Telecommunications and information exchange between systems Local and metropolitan area networks—Specific requirements—Part 11: Wireless LAN Medium Access Control (MAC) and Physical Layer (PHY) Specifications, Amendment 9: Wake-Up Radio Operation, 102 pages (Sep. 24, 2018).

* cited by examiner

… (1) …

PADDING FOR WAKEUP RADIO (WUR) PACKETS

CROSS REFERENCES TO RELATED APPLICATIONS

This application claims the benefit of U.S. Provisional Patent Application No. 62/753,619, entitled "Wake-Up Radio (WUR) FDMA Padding," filed on Oct. 31, 2018, which is hereby incorporated herein by reference in its entirety.

FIELD OF TECHNOLOGY

The present disclosure relates generally to wireless communication systems, and more particularly to formats of packets for communication systems employing wakeup radios (WURs).

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, some such wireless devices are battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wakeup radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup radio (WUR) wakeup packet (referred to herein simply as a "wakeup packet") addressed to the wireless device. In response to receiving the wakeup packet and determining that the wakeup packet is addressed to the wireless device, the LP-WUR wakes up the WLAN network interface so that the WLAN network interface is ready to receive data from the access point.

To improve efficiency, an access point can use a frequency division, multiple access (FDMA) transmission to wake up multiple different wireless devices with a single transmission. A wakeup packet transmitted using FDMA comprises different portions in different frequency subchannels, where each portion may correspond to a different wireless device. An LP-WUR tuned to one of the frequency subchannels will receive a respective portion of the wakeup packet and analyze an address in the respective portion of the wakeup packet to determine if the respective portion of the wakeup packet is addressed to a wireless device corresponding to the LP-WUR.

If the different portions of the wakeup packet transmitted using FDMA have different durations, conventionally, padding is added to one or more of the different portions so that all of the different portions have the same duration.

SUMMARY

In an embodiment, a method for generating and transmitting a wakeup radio (WUR) packet in a wireless local area network (WLAN) includes: generating, at a communication device, a first portion of the WUR packet, wherein the first portion of the WUR packet corresponds to a WLAN legacy PHY preamble of the WUR packet; generating, at the communication device, a second portion of the WUR packet, wherein generating the second portion of the WUR packet includes: generating the second portion of the WUR packet to include a WUR packet PHY sync signal, wherein the WUR packet PHY sync signal corresponds to a sync bit sequence with each bit in the sync bit sequence modulated by a sync waveform, generating the second portion of the WUR packet to include a PHY data portion, and generating the second portion of the WUR packet to include a padding signal, wherein the padding signal corresponds to a padding bit sequence with each bit in the padding bit sequence modulated by the sync waveform; and transmitting, by the communication device, the WUR packet.

In another embodiment, a wireless communication device comprises: a network interface device associated with a first communication device. The network interface device comprises one or more integrated circuit (IC) devices configured to: generate a first portion of a WUR packet, wherein the first portion of the WUR packet corresponds to a WLAN legacy PHY preamble of the WUR packet, and generate a second portion of the WUR packet. Generating the second portion of the WUR packet includes: generating the second portion of the WUR packet to include a WUR packet PHY sync signal, wherein the WUR packet PHY sync signal corresponds to a sync bit sequence with each bit in the sync bit sequence modulated by a sync waveform, generating the second portion of the WUR packet to include a PHY data portion, and generating the second portion of the WUR packet to include a padding signal, wherein the padding signal corresponds to a padding bit sequence with each bit in the padding bit sequence modulated by the sync waveform. The network interface device comprises one or more transceivers implemented on the one or more IC devices, the one or more transceivers configured to transmit the WUR packet.

DETAILED DESCRIPTION

A wireless communication device generates a wakeup packet that includes a sync portion and a data portion, and the wireless communication device adds a padding signal to the wakeup packet so that the sync portion, the data portion, and the padding signal together have a desired duration. If the padding signal corresponds to arbitrary data and the padding signal by chance is too similar to the sync portion, a low power wakeup radio (LP-WUR) receiving the wakeup packet may incorrectly detect in the padding signal a sync portion of a fictitious wakeup packet and attempt to decode the fictitious wakeup packet. While busy attempting to decode the fictitious wakeup packet, the LP-WUR may miss a subsequent transmission of an actual wakeup that is intended for the LP-WUR. To reduce a chance of an LP-WUR falsely detecting a sync portion in a padding signal, the padding signal is designed to reduce a correlation between the padding signal and the sync portion to an acceptable level, according to various embodiments described below.

Figure 1A:
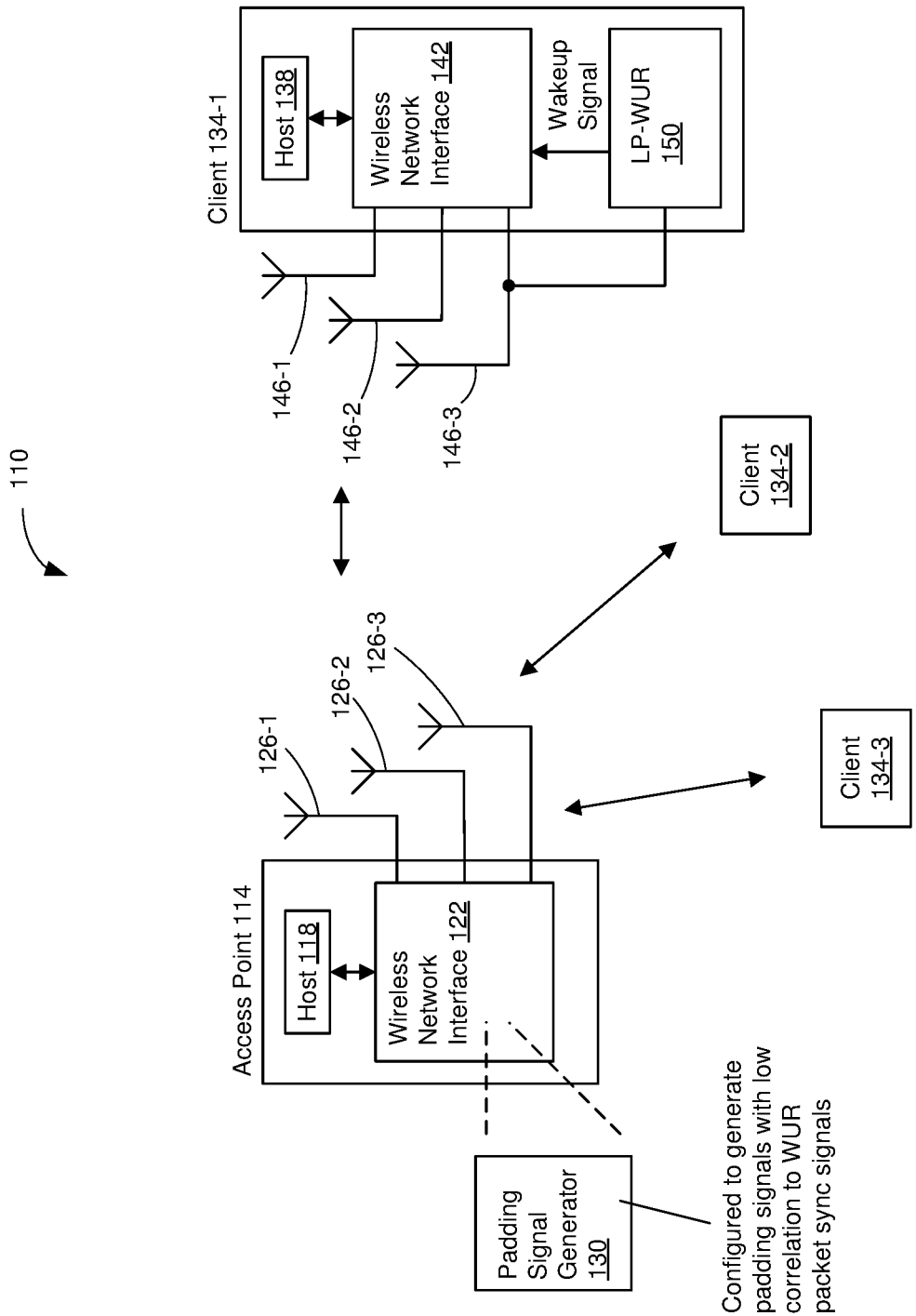
FIG. 1A is a block diagram of an example wireless local area network (WLAN) in which wakeup radio (WUR) packets with padding signals are transmitted, according to an embodiment.

FIG. 1A is a block diagram of an example wireless local area network (WLAN) 110 in which wakeup packets are utilized to wakeup WLAN network interfaces in the WLAN 110, according to an embodiment. The wakeup packets include a padding signal configured to reduce a correlation between the padding signal and a sync signal used in wakeup packets to an acceptable level, according to various embodiments described below. When the correlation between the padding signal and the sync signal used in wakeup packets is suitably low, a chance of a wireless communication device in the WLAN 110 falsely detecting the sync signal in a padding signal of a wakeup packet is suitably low.

The WLAN 110 includes an access point (AP) 114 that comprises a host processor 118 coupled to wireless network interface circuitry 122. The wireless network interface circuitry 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface circuitry 122 is configured to generate and transmit a wakeup packet that can be decoded by low power wakeup radios (LP-WURs) in the WLAN 110, wherein the wakeup packet is configured to prompt one or more of the LP-WURs to wake up a WLAN network interface coupled to the LP-WUR. Additionally, the wireless network interface circuitry 122 is configured to generate packets that can be decoded by at least some of the LP-WURs (e.g., one or more of the LP-WURs) in the WLAN 110, and that include data information instead of, or in addition to, data configured to cause a LP-WUR to wake up a WLAN network interface (sometimes referred to herein as "non-wakeup data"). Packets that can be decoded by at least some of the LP-WURs are referred to herein as "wakeup radio packets" or "WUR packets". WUR packets may be wakeup packets. WUR packets may also be packets that include non-wakeup data. Examples of non-wakeup data that may be included in WUR packets include WLAN beacon information, WUR capability information, WLAN capability information, WUR management data, WLAN management data, WUR control information, WLAN control information, etc. In an embodiment, the non-wakeup data can be used by the LP-WUR, and/or the WLAN network interface circuitry that is coupled to the LP-WUR, for purposes other than waking up the WLAN network interface circuitry.

The wireless network interface circuitry 122 includes a padding signal generator 130 that is configured to generate a padding signal to be added to a WUR packet so that the WUR packet has a desired duration. The padding signal generated by the padding signal generator 130 is configured to reduce a correlation between the padding signal and a sync signal used in WUR packets to an acceptable level, according to various embodiments described below.

The host processor 118 is configured to execute machine readable instructions stored in a memory device (not shown), according to an embodiment. The host processor 118 is implemented on an integrated circuit (IC), according to an embodiment. The wireless network interface circuitry 122 is implemented on one or more ICs. The host processor 118 is implemented on one IC and the wireless network interface circuitry 122 is implemented on one or more other, different ICs, according to an embodiment. The host processor 118 is implemented on a first IC and the wireless network interface circuitry 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface circuitry 142. The wireless network interface circuitry 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface circuitry 142 is configured to go into a low power state in which the wireless network interface circuitry 142 consumes significantly less power as compared to an active state of the wireless network interface circuitry 142. The wireless network interface circuitry 142 is capable of wirelessly receiving and transmitting via the one or more antennas 146 while in the active state. In an embodiment, the wireless network interface circuitry 142 is incapable of wirelessly receiving and transmitting via the one or more antennas 146 while in the low power state.

The client station 134-1 also includes a LP-WUR 150 coupled to the wireless network interface circuitry 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface circuitry 142 while the wireless network interface circuitry 142 is in the active state, according to an embodiment.

The LP-WUR 150 is configured to receive and decode WUR packets transmitted by the AP 114 and received via one or more of the antennas 146. The LP-WUR 150 is configured to determine whether a received WUR packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received WUR packet is a wakeup packet and includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface circuitry 142 is in the low power state and receives the wakeup signal from the LP-WUR 150, the wireless network interface circuitry 142 is configured to transition to the active power state in response to the wakeup signal, according to an embodiment. For example, when the wireless network interface circuitry 142 is in the low power state and receives the wakeup signal from the LP-WUR 150, the wireless network interface circuitry 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface circuitry 142 is implemented on one or more ICs. The host processor 138 is implemented on one IC and the wireless network interface circuitry 142 is implemented on one or more other, different ICs, according to an embodiment. The host processor 138 is implemented on a first IC and the wireless network interface circuitry 142 is implemented on at least the same first IC and optionally on one or more second ICs, according to an embodiment.

The LP-WUR 150 is implemented on one IC and the wireless network interface circuitry 142 is implemented on one or more other, different ICs, according to an embodiment. The LP-WUR 150 is implemented on a first IC and the wireless network interface circuitry 142 is implemented on at least the same first IC and optionally on one or more second ICs, according to an embodiment.

In some embodiments, the LP-WUR 150 is configured to process WUR packets that are transmitted at multiple different data rates, and/or is configured to process WUR packets that include non-wakeup data (such LP-WURs are sometimes referred to herein as "advanced LP-WURs"). A mode of operation in which a WUR packet that includes a wakeup packet is transmitted at the particular data rate is sometimes referred to as a "basic mode" or a "low data rate mode". A mode of operation in which a WUR packet includes non-wakeup data and/or is transmitted at a data rate other than the particular data rate is sometimes referred to as an "advanced mode" or a "high data rate mode".

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. In some embodiments, one or more of the client stations 134 are basic LP-WURs and one or more of the other client stations 134 are advanced LP-WURs.

Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

Figure 1B:
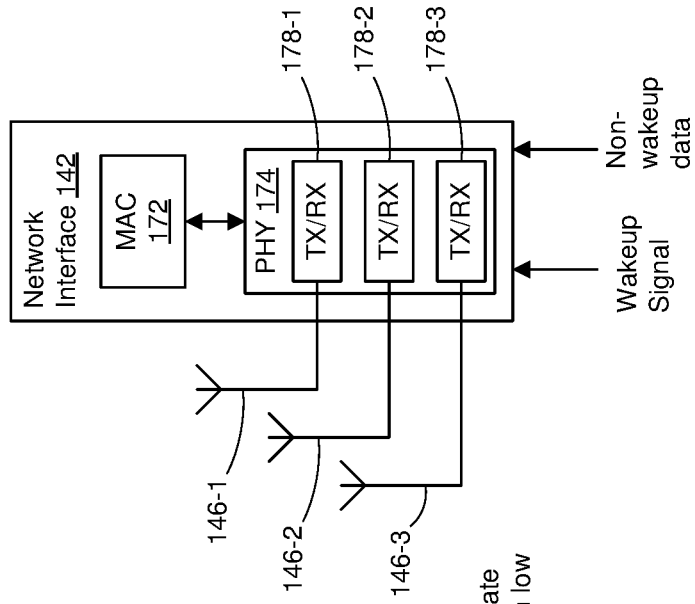
FIG. 1B is a block diagram of an example wireless network interface circuitry of an access point included in the WLAN of FIG. 1A, and which generates WUR packets with padding signals, according to an embodiment.

FIG. 1B is a block diagram of the network interface circuitry 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

In an embodiment, the PHY processor 164 includes the padding signal generator 130 discussed above.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units. PHY data units that conform to the WLAN communication protocol are sometimes referred to herein as "WLAN packets". MAC data units that conform to the WLAN communication protocol are sometimes referred to herein as "WLAN frames".

In connection with generating one or more radio frequency (RF) signals for transmission, the PHY processor 164 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 164 is configured to upconvert the one or more analog baseband signals to one or more RF signals for transmission via the one or more antennas 126.

In connection with receiving one or more RF signals, the PHY processor 164 is configured to downconvert the one or more RF signals to one or more analog baseband signals, and to convert the one or more analog baseband signals to one or more digital baseband signals. The PHY processor 164 is further configured to process (which may include demodulating, filtering, etc.) the one or more digital baseband signals to generate a PPDU.

Although not shown in FIG. 1B for purposes of clarity, the PHY processor 164 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

In an embodiment, the PHY processor 164 is configured to generate wakeup packets and transmit the wakeup packets at the particular data rate; and the PHY processor 164 is also configured to i) generate WUR packets that include non-wakeup data and/or ii) transmit WUR packets at a data rate other than the particular data rate.

Figure 1C:
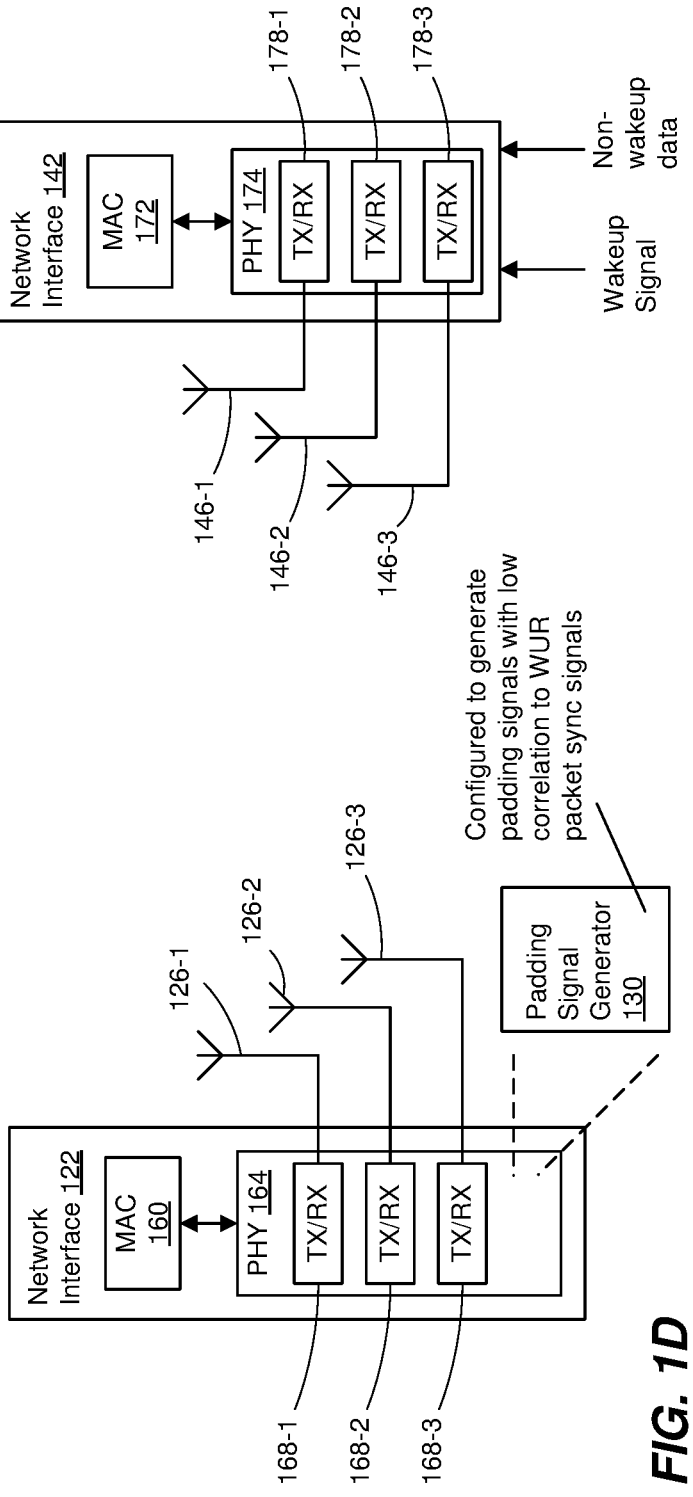
FIG. 1C is a block diagram of an example wireless network interface circuitry of the client station included in the WLAN of FIG. 1A, according to an embodiment.

FIG. 1C is a block diagram of the network interface circuitry 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 134-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface circuitry 142 is configured to transition between an active state and a low power state. When the wireless network interface circuitry 142 is in the low power state and receives the wakeup signal from the LP-WUR 150, the wireless network interface circuitry 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

In some embodiments, the wireless network interface circuitry 142 is configured to receive non-wakeup data from the LP-WUR 150, such as WLAN beacon information, WUR capability information, WLAN capability information, WUR configuration information, WLAN configuration information, WUR management information, WLAN management information, WUR control information, WLAN control information, etc. In an embodiment, the wireless network interface circuitry 142 is configured to use the non-wakeup data for purposes other than transitioning to the active power state. For example, the MAC processor 172 of the wireless network interface circuitry 142 is configured to use the non-wakeup data for performing MAC-related functions related to WLAN communications.

Figure 1D:
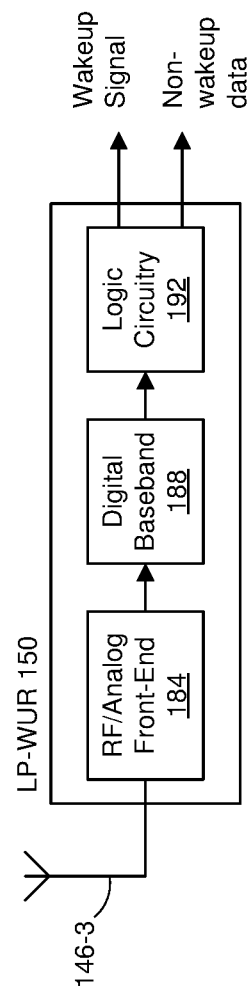
FIG. 1D is a block diagram of an example low power WUR (LP-WUR) in the WLAN of FIG. 1A, according to an embodiment.

FIG. 1D is a block diagram of the LP-WUR 150 of the client station 134-1 of FIG. 1A, according to an embodiment. The LP-WUR 150 includes RF/analog front-end circuitry 184 coupled to at least one of the antennas 146. The RF/analog front-end circuitry 184 includes one or more amplifiers (e.g., an LNA), an RF downconverter, one or more filters, and one or more ADCs. In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a WUR packet. The digital baseband circuitry 188 includes a demodulator that demodulates data from the digital baseband signal to generate an information signal corresponding to information included in a wakeup packet.

In some embodiments, the digital baseband circuitry 188 is configured to determine a data rate of a particular WUR packet.

The digital baseband circuitry 188 is coupled to logic circuitry 192. The logic circuitry 192 is configured to process the information signal to determine whether the information signal includes an address (e.g., a MAC address, an AID, or another suitable network address) corresponding to the client station 134-1, according to an embodiment. In embodiments in which the LP-WUR 150 is a basic LP-WUR, the logic circuitry 192 is configured to generate the wakeup signal in response to determining that the information signal includes the address corresponding to the client station 134-1. In embodiments in which the LP-WUR 150 is an advanced LP-WUR, the logic circuitry 192 is configured to generate the wakeup signal in response to determining that the information signal corresponds to a wakeup packet that includes the address corresponding to the client station 134-1.

In some embodiments, the LP-WUR 150 is configured to provide non-wakeup data, such as WLAN beacon information, WUR capability information, WLAN capability information, WUR configuration information, WLAN configuration information, WUR management information, WLAN management information, WUR control information, WLAN control information, etc., to the wireless network interface circuitry 142. In some embodiments, the LP-WUR 150 is configured to use at least some types of non-wakeup data such as WUR capability information, WUR configuration information, WUR management information, WUR control information, etc.

In some embodiments, the LP-WUR 150 includes, in addition to or instead of the logic circuitry 192, a processor (not shown) that is configured to execute machine readable instructions stored in a memory (not shown) of the LP-WUR 150. In some embodiments, the processor (not shown) of the LP-WUR 150 is configured to execute machine readable instructions to one or more of: i) process and/or use non-wakeup data, ii) provide non-wakeup data to the network interface circuitry 142, iii) generate the wakeup signal, etc.

Figure 2:
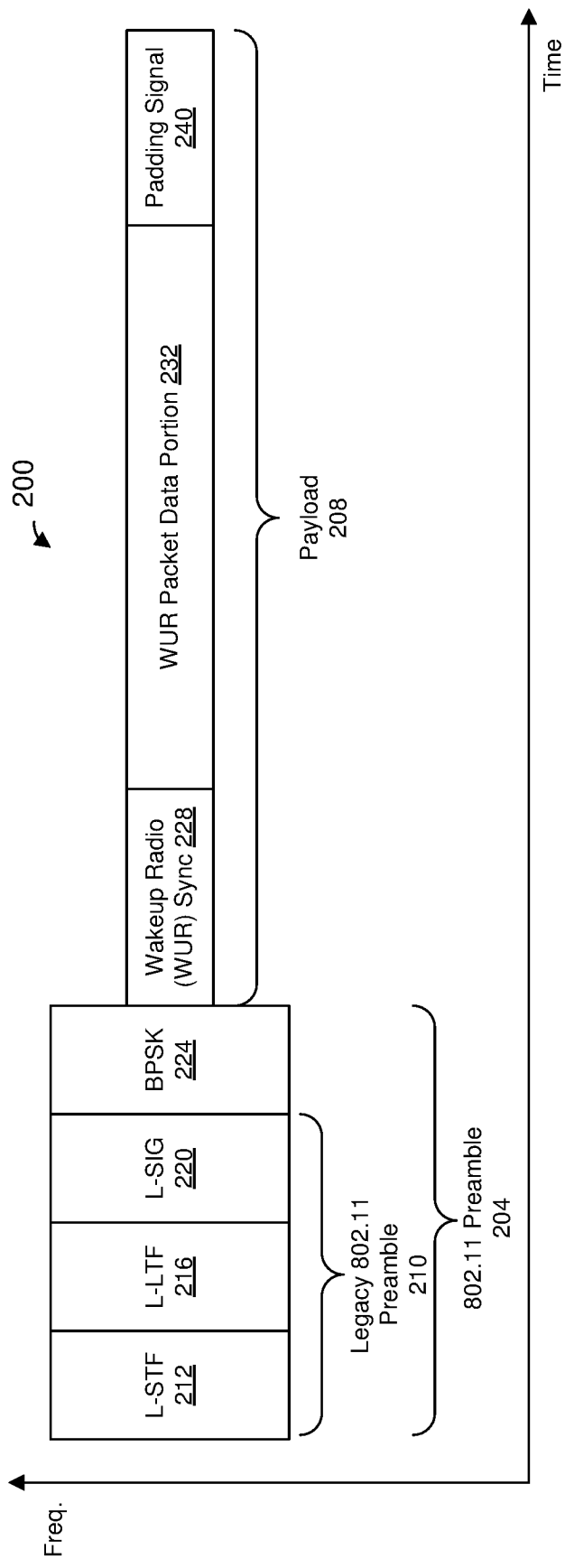
FIG. 2 is a diagram of an example WUR packet with a padding signal that is configured to reduce a probability of a LP-WUR falsely detecting a WUR sync signal in the padding signal, according to an embodiment.

FIG. 2 is a block diagram of a WUR packet 200 used in the example WLAN 110 of FIG. 1, according to an embodiment. The network interface 122 of the AP 114 is configured to generate and transmit the WUR packet 200, according to an embodiment. The network interface 142 of the client station 134-1 is also configured to generate and transmit the WUR packet 200, e.g., to another client station 134, according to another embodiment.

The LP-WUR 150 of the client station 134-1 is configured to receive, detect, and decode the WUR packet 200, according to an embodiment.

The WUR packet 200 includes an 802.11 preamble portion 204 and a payload 208. The 802.11 preamble portion 204 enables IEEE 802.11 stations (e.g., wireless communication devices that are configured to operate according to the IEEE 802.11 Standard) to detect the WUR packet 200 and determine a length of the WUR packet 200 for the purpose of reducing transmissions by IEEE 802.11 stations that will collide with the WUR packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, and a legacy signal field (L-SIG) 220. The L-STF 212 includes signals designed for packet detection and automatic gain control (AGC) training, for example. The L-LTF 216 includes signals designed for channel estimation, for example. The L-SIG 220 includes information regarding the WUR packet 200, including length information (e.g., in a length subfield (not shown)) that can be used by IEEE 802.11 stations to determine when the WUR packet 200 will end.

In other embodiments, the WUR packet 200 includes a legacy preamble (different than the legacy 802.11 preamble 210) that enables stations that conform to a different suitable wireless communication protocol (e.g., other than the IEEE 802.11 Standard) to detect the WUR packet 200 and determine a length of the WUR packet 200 for the purpose of reducing transmissions by such stations that will collide with the WUR packet 200, according to an embodiment.

In an embodiment, the 802.11 preamble portion 204 also includes an orthogonal frequency division multiplexing (OFDM) symbol 224 having binary phase shift keying (BPSK) modulated OFDM subcarriers that follows the legacy 802.11 preamble 210. In an embodiment, the BPSK modulated OFDM symbol 224 is a repetition of the L-SIG 220. In an embodiment, the BPSK modulated OFDM symbol 224 is identical to at least a portion of the L-LTF 216. In other embodiments, the BPSK modulated OFDM symbol 224 includes any other suitable signal and/or information. In an embodiment, the BPSK modulated symbol 224 does not convey any useful information to recipient communication devices. In another embodiment, the BPSK modulated OFDM symbol 224 does convey useful information to recipient communication devices. In some embodiments, the OFDM symbol 224 is omitted from the WUR packet 200.

The payload 208 includes a WUR sync 228. In an embodiment, the WUR sync 228 is configured to enable LP-WURs such as the LP-WUR 150 to detect the payload 208 of the WUR packet 200 and to synchronize to the payload 208 of the WUR packet 200. The WUR sync 228 corresponds to a sync bit sequence, where each bit in the sync bit sequence is modulated by a sync waveform w[n], where n is an index corresponding to a sampling rate, according to some embodiments. The WUR sync 228 is sometimes referred to herein as a WUR packet PHY sync signal. In some embodiments, w[n] comprises a least a time portion of an OFDM symbol with subcarriers set to predefined values. In some embodiments, w[n] comprises a time-truncation of an OFDM symbol with at least some alternating subcarriers set to predefined non-zero power values, and subcarriers between the alternating non-zero power subcarriers set to zero power. In some embodiments, w[n] is generated using techniques the same as or similar to techniques described in U.S. patent application Ser. No. 16/030,264, filed on Jul. 9, 2018, which is incorporated herein by reference. In other embodiments, other suitable sync waveforms are used.

In an embodiment, modulating a bit sequence by the sync waveform w[n] comprises transmitting the sync waveform w[n] when a bit is one, and transmitting zero power when a bit is zero. In some embodiments, modulating a bit sequence by the sync waveform w[n] comprises using techniques the same as or similar to techniques described in U.S. patent application Ser. No. 16/030,264, filed on Jul. 9, 2018. In other embodiments, other suitable techniques for modulating a bit sequence by a sync waveform are used.

In an illustrative embodiment, the sync bit sequence corresponds to a Manchester encoded sequence, and the sync bit sequence is modulated according to on-off keying (OOK) modulation. The WUR sync 228 includes a sync signal S[n], which corresponds to a sync bit sequence with each bit in the sync bit sequence is modulated by the sync waveform w[n], according to an embodiment.

The payload 208 also includes a WUR packet data portion 232. In an embodiment, the WUR packet data portion 232 includes an address (e.g., a MAC address, an AID, or another suitable network address) corresponding to a client station (or client stations) to which the WUR packet 200 is intended. Referring now to FIG. 1D, the digital baseband circuitry 188 is configured to detect the WUR packet 200 at least by detecting the WUR preamble 228, according to an embodiment. The logic circuitry 192 is configured to process the WUR packet body 232 to determine whether the WUR packet body 232 includes an address (e.g., a MAC address, an AID, or another suitable network address) corresponding to the client station 134-1.

In some embodiments, the WUR packet data portion 232 can be transmitted according to different modes that correspond to different data rates. For example, as discussed above, the WUR packet data portion 232 can be transmitted according to the basic mode (or low data rate mode) or the advanced mode (or high data rate mode). In an embodiment, when the WUR packet data portion 232 is transmitted according to the basic mode (or low data rate mode), the WUR packet data portion 232 is transmitted according to a first data rate; whereas when the WUR packet data portion 232 is transmitted according to the advanced mode (or high data rate mode), the WUR packet data portion 232 is transmitted according to a second data rate that is higher than the first data rate. In an illustrative embodiment, the second data rate is twice the first data rate.

In some embodiments in which the padding signal 240 is a transmitted at a same data rate irrespective of a data rate of the WUR packet data portion 232, and when the WUR packet data portion 232 is transmitted at a different rate than the data rate of the padding signal, the wireless network interface 122 switches (e.g., the PHY processor 164 switches) data rates at an end of the WUR packet data portion 232.

To permit a receiver to distinguish between the different modes, a respective WUR sync 228 is used for the respective modes. In one embodiment, when using the advanced mode (or high data rate mode), the WUR sync 228 is the sync signal S[n] discussed above, whereas when using the basic mode (or low data rate mode), the WUR sync 228 is 1−S[n] concatenated with 1−S[n], where 1−S[n] is the complement of S[n]. Thus, when using the using the basic mode (or low data rate mode), the WUR sync 228 has a duration that is twice a duration of the WUR sync 228 when using the using the advanced mode (or high data rate mode). The sync signal S[n] can also be defined as 1−S'[n], where S'[n] is the complement of S[n]. Thus, when using the advanced mode (or high data rate mode), the WUR sync 228 is 1−S'[n], whereas when using the basic mode (or low data rate mode), the WUR sync 228 is S'[n] concatenated with S'[n], where 1−S'[n] is the complement of S'[n].

In an embodiment, the WUR packet data portion 232 has a fixed, predetermined length when transmitted according to the basic mode (or low data rate mode), whereas the WUR packet data portion 232 has a variable length when transmitted according to the advanced mode (or high data rate mode).

The payload 208 also includes a padding signal 240. The padding signal 240 is configured to reduce a correlation between the padding signal 240 and the sync signal 228, according to various embodiments described below. In an embodiment, the padding signal 240 corresponds to a padding bit sequence p[n] with each bit in the padding bit sequence p[n] modulated by the sync waveform w[n]. In an illustrative embodiment, the padding bit sequence p[n] corresponds to a Manchester encoded sequence, and the padding bit sequence p[n] is modulated according to OOK modulation. In an embodiment, p[n] has a duration of 64 microseconds, and w[n] has a duration of 2 microseconds. In other embodiments, p[n] has another suitable duration and/or w[n] has another suitable duration.

In an embodiment in which each bit in the padding bit sequence p[n] is modulated by the sync waveform w[n], the padding signal 240 corresponds to a same data rate irrespective of a data rate of the WUR packet data portion 232. For example, the padding signal 240 corresponds to the second data rate (corresponding to the advanced mode, or high data rate mode) even when the WUR packet data portion 232 is transmitted at the first data rate (corresponding to the basic mode, or low data rate mode).

Figure 3:
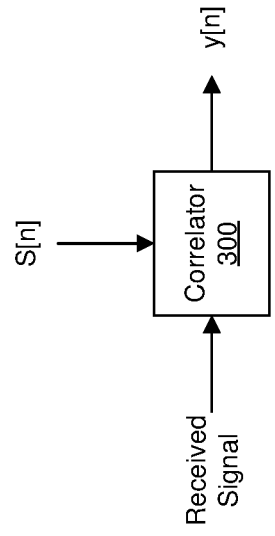
FIG. 3 is a diagram of an example correlator used by the LP-WUR of FIG. 1D to detect WUR sync signals in a received signal, according to an embodiment.

FIG. 3 is a diagram of an example correlator 300 included in an LP-WUR, such as the LP-WUR 150 of FIG. 1D, according to an embodiment. Referring now to FIGS. 2 and 3, the correlator 300 is used by the LP-WUR to detect the WUR sync 228 in a received signal. For example, when an output of the correlator 300 exceeds a threshold, the LP-WUR determines that the WUR sync 228 is detected.

When the LP-WUR is receiving the padding signal 240, an output y[n] of the correlator 300 can be modeled as:

$$y[n]=w[n]\otimes p[n]\otimes (2S[n]-1) \qquad \text{Equ. 1}$$

where $\otimes$ denotes circular convolution, and where $w[n]\otimes p[n]$ corresponds to the padding signal 240. To reduce the chance of false detection of the WUR sync 228 in the padding signal 240, the padding sequence p[n] is chosen to minimize:

$$\max_n |p[n]\otimes (2S[n]-1)| \qquad \text{Equ. 2}$$

or at least keep the value corresponding to Equ. 2 to less than a suitable threshold that reduces the chance of false detection of the WUR sync 228 in the padding signal 240 to an acceptable level.

In some embodiments, the padding sequence p[n] is chosen such that, in addition to keeping the value corresponding to Equ. 2 to less than a suitable threshold, the padding sequence p[n] includes no more than four consecutive zeros (or the padding signal 240 does not remain in an OFF state when OOK modulation is used for greater than 8 microseconds), and/or begins with no more than two consecutive zeros (or the padding signal 240 does begin in the OFF state when OOK modulation is used for greater than 4 microseconds).

In some embodiments, the criteria discussed above are satisfied by a padding sequence p[n] that consists of an alternating sequence of zeros and ones. For example, in one embodiment of a padding sequence p[n] corresponding to a duration of 64 microseconds, p[n] is:
 [0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1], which corresponds to a Manchester encoded sequence of all ones. In another embodiment of a padding sequence p[n] corresponding to a duration of 64 microseconds, p[n] is:
 [1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0 1 0]],
which corresponds to a Manchester encoded sequence of all zeros. In another embodiment of a padding sequence p[n] corresponding to a duration of 64 microseconds, p[n] is:
 [0 1 0 0 1 0 1 0 0 1 0 1 0 1 1 0 1 0 0 1 0 1 0 1 0 0 1 0 1 1 0 1].

Embodiments of padding sequences described above correspond to a particular duration (e.g., 64 microseconds or another suitable duration). When padding greater than the particular duration is needed, the padding sequence is repeated as many times as necessary to achieve a desired padding duration.

In an embodiment, the legacy 802.11 preamble 210 spans a first frequency bandwidth, and the WUR preamble 228 and the WUR packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc.

Figure 4:
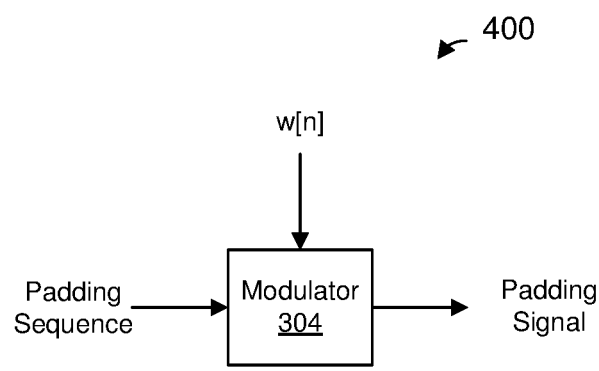
FIG. 4 is a diagram of an example padding signal generator for generating a padding signal in a WUR packet, according to an embodiment.

In some embodiments, the padding signal 240 is generated by the padding signal generator 130 (FIG. 1A). FIG. 4 is a diagram of an example padding signal generator 400 that is utilized as the padding signal generator 130, according to an embodiment.

The padding signal generator 400 includes a modulator 304 that receives a padding sequence (e.g., p[n] described above or another suitable padding sequence) and modulates the padding sequence with the sync waveform w[n] discussed above. In an embodiment, the modulator 304 includes a convolution calculator that generates the padding signal as a convolution of the padding sequence and w[n]. In an embodiment, the modulator 304 is implemented using digital circuitry.

In operation, when a padding signal is to be generated, the modulator 304 modulates each bit of the padding sequence with the sync waveform w[n] to generate the padding signal.

Figure 5:
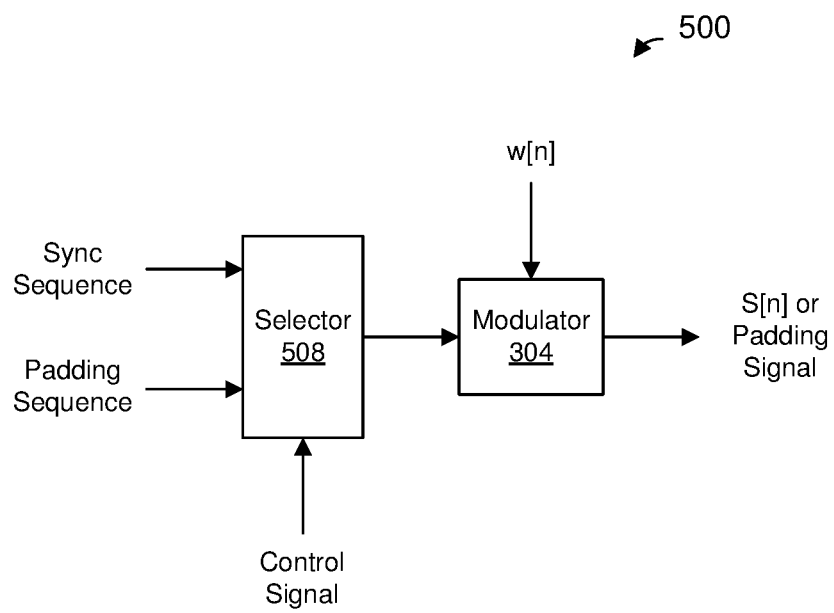
FIG. 5 is a diagram of an example sync signal and padding signal generator for generating a sync signal and a padding signal for a WUR packet, according to another embodiment.

In some embodiments, the padding signal generator 130/400 is omitted, and the padding signal is generated with circuitry of WUR sync generator. For example, FIG. 5 is a diagram of an example sync/padding signal generator 500 that is utilized to generate both the WUR sync 228 and the padding signal 240, according to an embodiment.

The sync/padding signal generator 500 includes the modulator 304 discussed above with reference to FIG. 4, or another suitable modulator. The sync/padding signal generator 500 also comprises a selector 508. The selector 508 is configured to select either i) a sync sequence for generating the WUR sync or ii) the padding sequence (e.g., p[n] described above or another suitable padding sequence) for generating the padding signal 240, in response to a control signal. For example, when the WUR sync 228 is to be generated the control signal selects the sync sequence, and when the padding signal 240 is to be generated the control signal selects the padding sequence.

In an embodiment, the selector 508 comprises a multiplexer circuit.

An output of the selector 508 is provided to the modulator 304, which modulates the output of the selector 508 with the sync waveform w[n].

In operation, when the WUR sync 228 is to be generated, the control signal selects the sync sequence, and the modulator 304 modulates each bit of the sync sequence with the sync waveform w[n]. In operation, when a padding signal is to be generated, the control signal selects the padding sequence and the modulator 304 modulates each bit of the padding sequence with the sync waveform w[n] to generate the padding signal.

Figure 6:
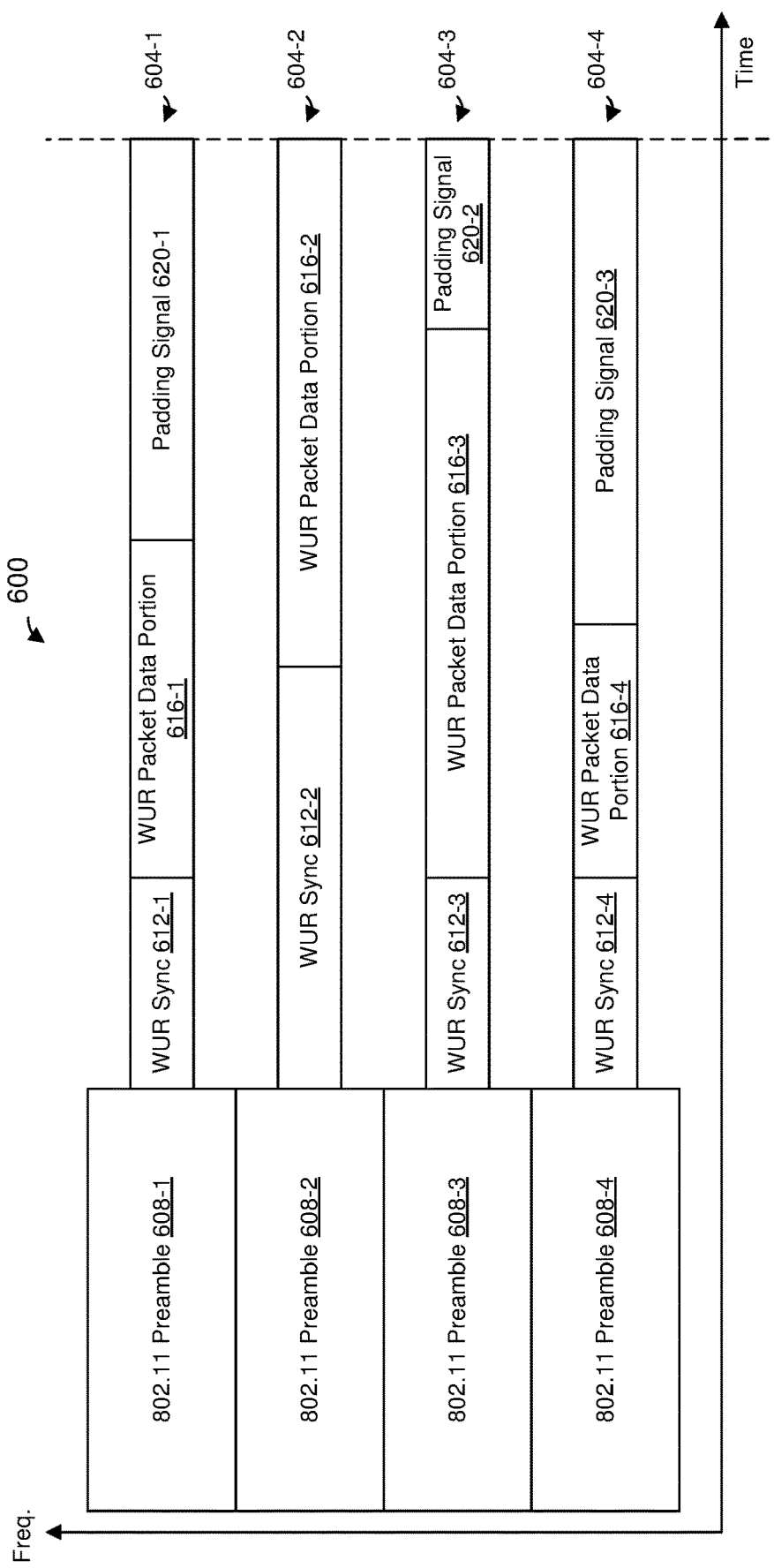
FIG. 6 is a diagram of an example frequency division, multiple access (FDMA) data unit that includes padding signals that are configured to reduce a probability of a LP-WUR falsely detecting a WUR sync signal in the padding signals, according to an embodiment.

FIG. 6 is a diagram of an example frequency division, multiple access (FDMA) data unit 600 that employs padding such as described above, according to an embodiment. In an embodiment, the wireless network interface 122 of the access point 114 (FIG. 1A) is configured to generate and transmit the FDMA data unit 600. In an embodiment, the PHY processor 164 (FIG. 1B) of the access point 114 is configured to generate and transmit the FDMA data unit 600. In an embodiment, the wireless network interface 142 of the client stations 134-1 (FIG. 1A) is configured to generate and transmit the FDMA data unit 600. In an embodiment, the PHY processor 174 (FIG. 1C) of the client stations 134-1 is configured to generate and transmit the FDMA data unit 600.

The FDMA data unit 600 includes a plurality of WUR packets 604 in respective frequency subchannels. Each WUR packet 604 includes an 802.11 preamble portion 608 the same as or similar to the 802.11 preamble portion 204 described above with reference to FIG. 2. Additionally, each WUR packet 604 includes a WUR sync 612 the same as or similar to the WUR sync 228 described above with reference to FIG. 2.

In an embodiment, the WUR packets 604-1, 604-3, and 604-4 are transmitted according to the advanced mode (or high data rate mode), whereas the WUR packet 604-2 is transmitted according to the basic mode (or low data rate mode). In an embodiment, each of the WUR sync 612-1, the WUR sync 612-3, and the WUR sync 612-4 is the sync signal S[n], whereas the WUR sync 612-2 is 1–S[n] concatenated with 1–S[n], where 1–S[n] is the complement of S[n]. In another embodiment, each of the WUR sync 612-1, the WUR sync 612-3, and the WUR sync 612-4 is 1–S'[n], whereas the WUR sync 612-2 is S'[n] concatenated with S'[n], where 1–S'[n] is the complement of S'[n]. In an embodiment, the WUR sync 612-2 has a duration that is longer than a duration of the WUR sync 612-1, the WUR sync 612-3, and the WUR sync 612-4. In an embodiment, duration of the WUR sync 612-2 is twice the duration of the WUR sync 612-1, the WUR sync 612-3, and the WUR sync 612-4.

Each WUR packet 604 includes a WUR packet data portion 616 similar to the WUR packet data portion 232 described above with reference to FIG. 2. At least some of the WUR packet data portions 616 end at different times as depicted in FIG. 6. So that all of the WUR packets 604 end at a same time, some of the WUR packets 604 include padding signals 620 the same as or similar to the padding signal 240 described above with reference to FIG. 2.

Figure 7:
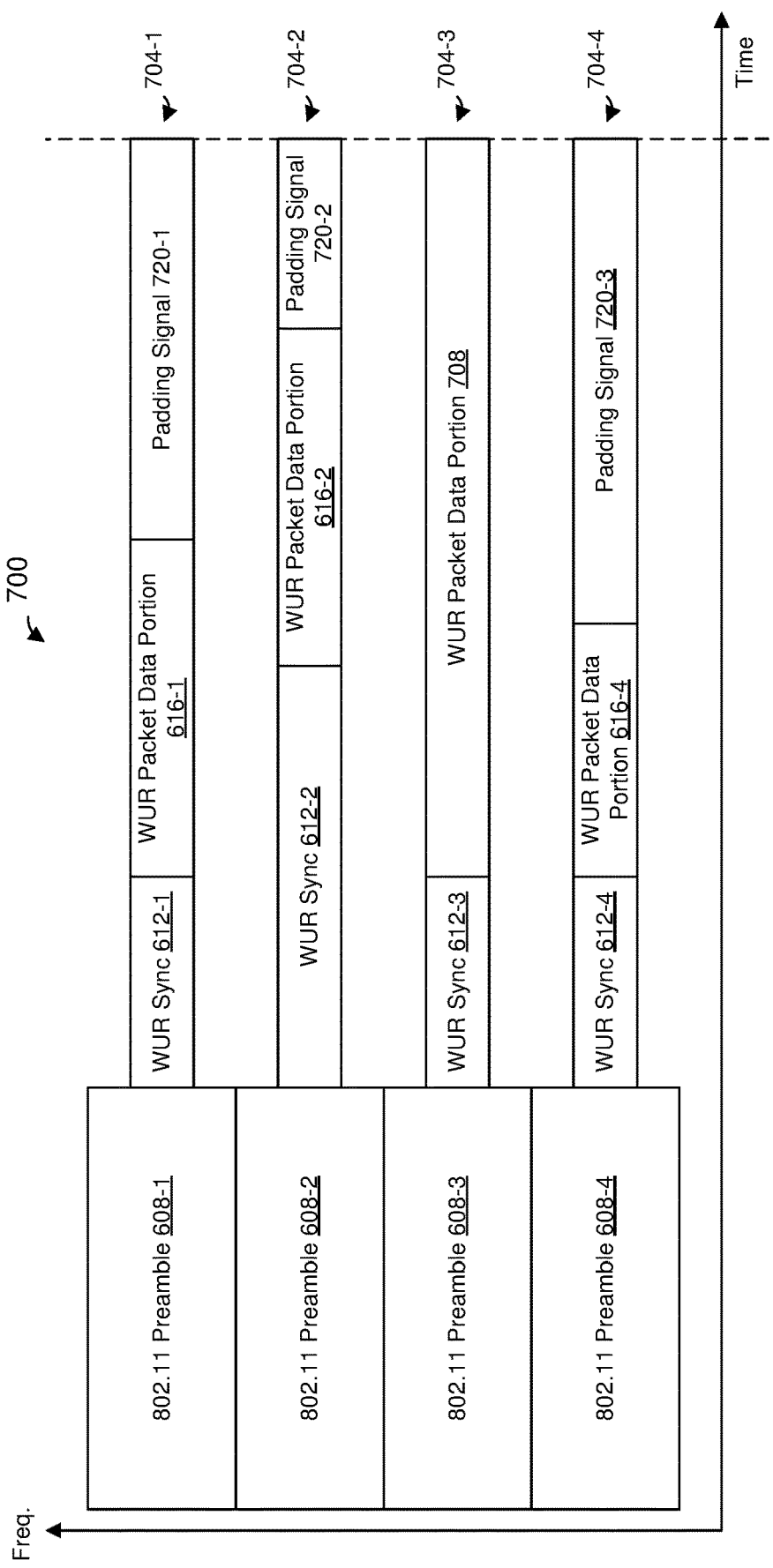
FIG. 7 is a diagram of another example FDMA data unit that includes padding signals that are configured to reduce a probability of a LP-WUR falsely detecting a WUR sync signal in the padding signals, according to another embodiment.

FIG. 7 is a diagram of another example FDMA data unit 700 that employs padding such as described above, according to an embodiment. In an embodiment, the wireless network interface 122 (FIG. 1A) is configured to generate and transmit the FDMA data unit 700. In an embodiment, the PHY processor 164 (FIG. 1B) is configured to generate and transmit the FDMA data unit 700. In an embodiment, the wireless network interface 142 (FIG. 1A) is configured to generate and transmit the FDMA data unit 700. In an embodiment, the PHY processor 174 (FIG. 1C) is configured to generate and transmit the FDMA data unit 700.

The FDMA data unit 700 is similar to the FDMA data unit 600, and elements with the same reference numbers are not described again in detail for purposes of brevity. In the FDMA data unit, WUR packet data portion 704.

The FDMA data unit 700 includes a plurality of WUR packets 704 in respective frequency subchannels. The WUR packet 704-3 includes a WUR packet data portion 708 that extends in time beyond an end of the WUR packet data portion 616-2 of the WUR packet 704-2. Therefore, so that the WUR packet 704-2 ends at a same time as the WUR packet 704-3, a padding signal 720-2 is appended to the WUR packet 704-2. More generally, so that all of the WUR packets 704 end at a same time, padding signals 720 are added to the WUR packet 704-1, the WUR packet 704-2, and the WUR packet 704-4. In some embodiments, the padding signals 720 are the same as or similar to the padding signal 240 described above with reference to FIG. 2.

In an embodiment, the WUR packets 704-1, 704-3, and 704-4 are transmitted according to the advanced mode (or high data rate mode), whereas the WUR packet 704-2 is transmitted according to the basic mode (or low data rate mode). In an embodiment, the WUR packet data portion 616-2 corresponds to a first data rate, whereas the padding signal 720-2 corresponds to a second data rate that is higher than the first data rate. In some embodiments, the WUR sync 612-2 corresponds to the first data rate, whereas the padding signal 720-2 corresponds to the second data rate that is higher than the first data rate.

In some embodiments, all of the padding signal 720-1, the padding signal 720-2, and the padding signal 720-3 correspond to the same second data rate that is higher than the first data rate. In some embodiments, the WUR sync 612-1, the WUR sync 612-3, and the WUR sync 612-4 correspond to the second data rate that is higher than the first data rate, whereas the WUR sync 612-2 corresponds to the first data rate.

Figure 8:
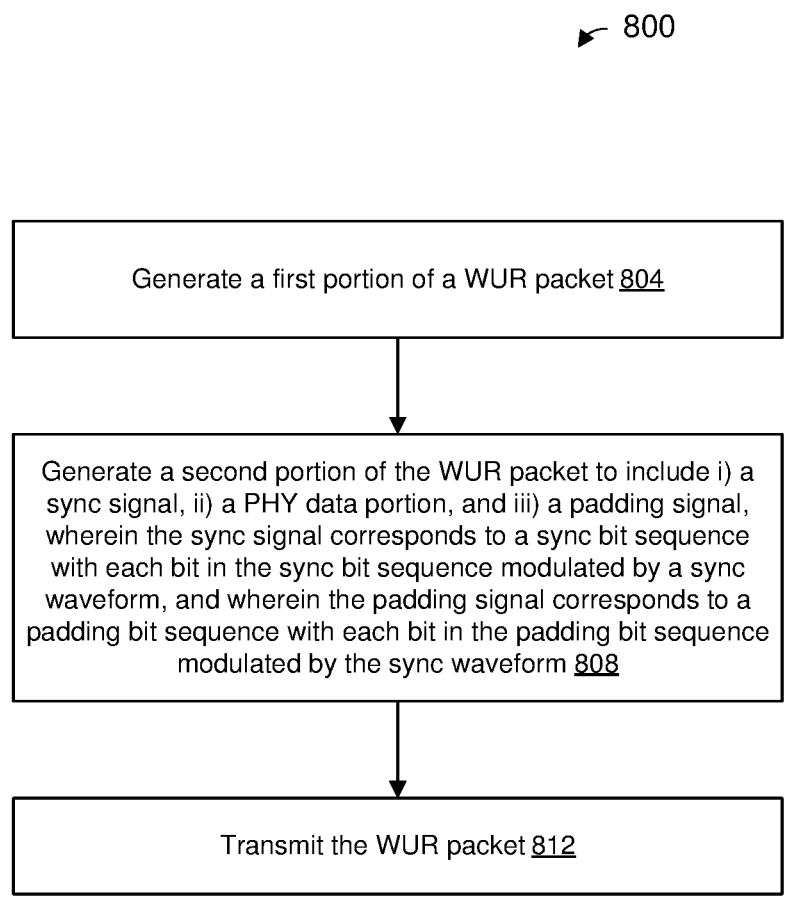
FIG. 8 is a flow diagram of an example method for generating and transmitting a WUR packet that includes a padding signal that is configured to reduce a probability of an LP-WUR falsely detecting a WUR sync signal in the padding signal, according to an embodiment.

FIG. 8 is a flow diagram of an example method 800 for generating and transmitting a WUR packet in a WLAN, according to an embodiment. In an embodiment, the wireless network interface 122 is configured to perform the method 800. In an embodiment, the PHY processor 164 is configured to perform the method 800. In an embodiment, the wireless network interface 142 is configured to perform the method 800. In an embodiment, the PHY processor 174 is configured to perform the method 800. In other embodiments, however, the method 800 is performed by another suitable communication device.

At block 804, a communication device generates (e.g., the wireless network interface 122 generates, the PHY processor 164 generates, the wireless network interface 142 generates, the PHY processor 174 generates, etc.) a first portion of a WUR packet. In an embodiment, the first portion of the WUR packet corresponds to a WLAN legacy PHY preamble of the WUR packet. In another embodiment, the first portion of the WUR packet corresponds to another suitable PHY preamble defined by a suitable wireless communication protocol.

At block 808, the communication device generates (e.g., the wireless network interface 122 generates, the PHY processor 164 generates, the wireless network interface 142 generates, the PHY processor 174 generates, etc.) a second portion of the WUR packet. Generating the second portion of the WUR packet at block 808 includes: generating the second portion of the WUR packet to include a sync signal, wherein the sync signal corresponds to a sync bit sequence with each bit in the sync bit sequence modulated by a sync waveform, generating the second portion of the WUR packet to include a PHY data portion, and generating the second portion of the WUR packet to include a padding signal. In some embodiments, the padding signal corresponds to a padding bit sequence with each bit in the padding bit sequence modulated by the sync waveform.

In some embodiments, the sync waveform comprises a least a time portion of an OFDM symbol with subcarriers set to predefined values. In some embodiments, the sync waveform comprises a time-truncation of an OFDM symbol with at least some alternating subcarriers set to predefined non-zero power values, and subcarriers between the alternating non-zero power subcarriers set to zero power. For example, an IDFT (or IFFT) performed on OFDM tones with alternating subcarriers set to predefined non-zero power values, and subcarriers between the alternating non-zero power subcarriers set to zero power, will generate multiple periods of a time-domain signal; and the sync waveform corresponds to a truncation of the time-domain signal so that the sync waveform includes only a subset of the periods (i.e., not all of the periods) of the time-domain signal. In some embodiments, the sync waveform corresponds to time domain signals the same as or similar to time domain signals described in U.S. patent application Ser. No. 16/030,264, filed on Jul. 9, 2018. In other embodiments, other suitable sync waveforms are used.

In an embodiment, modulating a bit sequence by the sync waveform comprises transmitting the sync waveform when a bit is one, and transmitting zero power when a bit is zero. In some embodiments, modulating a bit sequence by the sync waveform comprises using techniques the same as or similar to techniques described in U.S. patent application Ser. No. 16/030,264, filed on Jul. 9, 2018. In other embodiments, other suitable techniques for modulating a bit sequence by a sync waveform are used.

In some embodiments, the padding bit sequence is a sequence of alternating ones and zeros. In an embodiment, the sequence of alternating ones and zeros corresponds to a Manchester encoded sequence of all ones. In another embodiment, the sequence of alternating ones and zeros corresponds to a Manchester encoded sequence of all zeros.

In some embodiments, the padding signal corresponds to the padding bit sequence with each bit in the padding bit sequence modulated by the sync waveform using OOK modulation.

In some embodiments, generating the second portion of the WUR packet at block 804 includes: generating the PHY data portion according to a first data rate, and generating the padding signal according to a second data rate that is higher than the first data rate.

In some embodiments, generating the first portion of the WUR packet at block 804 comprises generating the first portion of the WUR packet to span a plurality of subchannels; and generating the second portion of the WUR packet at block 808 comprises generating the second portion of the WUR packet to be within a first subchannel among the plurality of subchannels. In some embodiments, the sync signal generated at block 808 is a first WUR packet PHY sync signal within the first subchannel; and the PHY data portion generated at block 808 is a first PHY data portion within the first subchannel. In some embodiments, the method 800 further comprises the communication device generating (e.g., the wireless network interface 122 generating, the PHY processor 164 generating, the wireless network interface 142 generating, the PHY processor 174 generating, etc.) a third portion of the WUR packet to be within a second subchannel among the plurality of subchannels. In an embodiment, generating the third portion of the WUR packet includes: generating the third portion of the WUR packet to include a second sync signal within the second subchannel, wherein the second sync signal corresponds the sync bit sequence with each bit in the sync bit sequence modulated by the sync waveform, and generating the third portion of the WUR packet to include a second PHY data portion within the second subchannel.

In some embodiments, the method 800 further comprises generating the second PHY data portion according to a first data rate; and wherein generating the second portion of the WUR packet at block 808 comprises generating the padding signal according to a second data rate that is higher than the first data rate. In an embodiment, wherein generating the second portion of the WUR packet at block 808 comprises generating the first PHY data portion according to the second data rate.

In some embodiments, the first sync signal has a first duration; and the second sync signal has a second duration that is longer than the first duration.

At block 812, the communication device transmits (e.g., the wireless network interface 122 transmits, the PHY processor 164 transmits, the wireless network interface 142 transmits, the PHY processor 174 transmits, etc.) the WUR packet.

Although in some embodiments discussed above with reference to FIGS. 2-8 a data rate of the padding signal is the same irrespective of a data rate corresponding to a data portion of the WUR packet, in other embodiments the data rate of the padding signal is different depending on a data rate corresponding to the data portion of the WUR packet. For example, the data rate of the padding signal corresponds to a data rate of the data portion of the WUR packet, in an embodiment.

In an embodiment, the data portion is generated by modulating each bit of a Manchester encoded data bit sequence by a waveform wd[n], and the padding signal corresponds to a padding bit sequence p[n] with each bit in the padding bit sequence p[n] modulated by the waveform wd[n]. In an embodiment, wd[n] and p[n] correspond to a data rate of the data portion of the WUR packet.

In an illustrative embodiment, the padding bit sequence p[n] corresponds to a Manchester encoded sequence, and the padding bit sequence p[n] is modulated according to OOK modulation. In an embodiment, wd[n] has a duration of 2 microseconds when the data portion is generated according to the advanced mode (or high data rate mode), and has a duration of 4 microseconds when the data portion is generated according to the basic mode (or low data rate mode). In other embodiments, wd[n] has another suitable duration. In an illustrative embodiment, wd[n] is the same as the sync waveform w[n] when the data portion is generated according to the advanced mode (or high data rate mode), and wd[n] corresponds to two periods the sync waveform w[n] (e.g., w[n] concatenated with w[n]) when the data portion is generated according to the basic mode (or low data rate mode).

In some embodiment in which a data rate corresponding to the padding signal varies depending on a data rate of the data portion of the WUR packet, p[n] is chosen to minimize a value corresponding to Equ. 2, or at least keep the value corresponding to Equ. 2 to less than a suitable threshold that reduces the chance of false detection of the WUR sync in the padding signal to an acceptable level.

In an embodiment, p[n] is a Manchester encoded sequence corresponding to all ones. In another embodiment, p[n] is a Manchester encoded sequence corresponding to all zeros. In other embodiments, p[n] is another suitable fixed sequence that minimizes a value corresponding to Equ. 2, or at least keep the value corresponding to Equ. 2 to less than a suitable threshold that reduces the chance of false detection of the WUR sync in the padding signal to an acceptable level.

In some embodiments involving FDMA data units, respective random or pseudorandom phases are applied to respective padding signals in respective subchannels to avoid spectrum spikes in the padding signal. In some embodiments involving FDMA data units, cyclic shift diversity (CSD) is used and respective cyclic delays are applied to respective padding signals in respective subchannels to reduce a peak-to-average power ratio (PAPR) in the padding signal.

Although some embodiments discussed use Manchester encoding for the padding sequence p[n], in other embodiments Manchester encoding is not used and all bits of p[n] are ones. In such embodiments, a power level of the padding signal will be higher than the data portion. Thus, in some embodiments in which all bits of p[n] are ones, the wireless network interface reduces a transmit power of the wireless network interface when transmitting the padding signal (as compared to when transmitting the data portion) so that the transmit power level of the padding signal is more in line with a transmit power level of the data portion (as compared to using the same transmit power used for transmitting the data portion).

Although in some embodiments discussed above with reference to FIGS. 2-8 the padding bit sequence is a fixed bit sequence, in other embodiments the padding bit sequence is randomly or pseudorandomly generated. For example, in an embodiment, a MAC processor (e.g., the MAC processor 160 or the MAC processor 172 (FIGS. 1B and 1C)) includes a random state machine, and the MAC processor uses the random state machine to generate the padding sequence; the MAC processor than provides the padding sequence to a PHY processor (e.g., the PHY processor 164 or the PHY processor 174 (FIGS. 1B and 1C)) to generate the padding signal. In another embodiment, the a PHY processor (e.g., the PHY processor 164 or the PHY processor 174 (FIGS. 1B and 1C)) includes a random state machine (e.g., for performing a bit scrambling function), and the PHY processor uses the random state machine to generate the padding sequence.

In some embodiments in which the padding bit sequence is a random or pseudorandom sequence, the data rate of the padding signal is different depending on a data rate corresponding to the data portion of the WUR packet. For example, the data rate of the padding signal corresponds to a data rate of the data portion of the WUR packet, in an embodiment.

Techniques for generating padding signals for packets are described above in the context of WUR packets transmitted in WLANs merely for explanatory purposes. In other embodiments, padding signal generation techniques such as described above are utilized in packets of other types of wireless communication systems such as personal area networks (PANs), mobile communication networks such as cellular networks, metropolitan area networks (MANs), satellite communication networks, etc.

Embodiment 1

A method for generating and transmitting a wakeup radio (WUR) packet in a wireless local area network (WLAN), the method comprising: generating, at a communication device, a first portion of the WUR packet, wherein the first portion of the WUR packet corresponds to a WLAN legacy PHY preamble of the WUR packet; generating, at the communication device, a second portion of the WUR packet, wherein generating the second portion of the WUR packet includes: generating the second portion of the WUR packet to include a WUR packet PHY sync signal, wherein the WUR packet PHY sync signal corresponds to a sync bit sequence with each bit in the sync bit sequence modulated by a sync waveform, generating the second portion of the WUR packet to include a PHY data portion, and generating the second portion of the WUR packet to include a padding signal, wherein the padding signal corresponds to a padding bit sequence with each bit in the padding bit sequence modulated by the sync waveform; and transmitting, by the communication device, the WUR packet.

Embodiment 2

The method of embodiment 1, wherein: generating the second portion of the WUR packet comprises including in the second portion of the WUR packet a padding signal that corresponds to a padding bit sequence that is a sequence of alternating ones and zeros.

Embodiment 3

The method of embodiment 2, wherein generating the second portion of the WUR packet comprises including in the second portion of the WUR packet a padding signal that corresponds to a sequence of alternating ones and zeros that corresponds to a Manchester encoded sequence of all ones.

Embodiment 4

The method of embodiment 2, wherein generating the second portion of the WUR packet comprises including in the second portion of the WUR packet a padding signal that corresponds to a sequence of alternating ones and zeros that corresponds to a Manchester encoded sequence of all zeros.

Embodiment 5

The method of any of embodiments 2-4, wherein generating the second portion of the WUR packet comprises including in the second portion of the WUR packet a padding signal that corresponds to a padding bit sequence with each bit in the padding bit sequence modulated by the sync waveform using on-off keying (OOK) modulation.

Embodiment 6

The method of any of embodiments 1-5, further comprising: generating the PHY data portion according to a first data rate; and generating the padding signal according to a second data rate that is higher than the first data rate.

Embodiment 7

The method of embodiment 6, wherein: generating the first portion of the WUR packet comprises generating the first portion of the WUR packet to span a plurality of subchannels; generating the second portion of the WUR packet comprises generating the second portion of the WUR packet to be within a first subchannel among the plurality of subchannels; the WUR packet PHY sync signal is a first WUR packet PHY sync signal within the first subchannel; the PHY data portion is a first PHY data portion within the first subchannel; the method further comprises generating, at the communication device, a third portion of the WUR packet to be within a second subchannel among the plurality of subchannels, wherein generating the third portion of the WUR packet includes: generating the third portion of the WUR packet to include a second WUR packet PHY sync signal within the second subchannel, wherein the second WUR packet PHY sync signal corresponds the sync bit sequence with each bit in the sync bit sequence modulated by the sync waveform, and generating the third portion of the WUR packet to include a second PHY data portion within the second subchannel.

Embodiment 8

The method of embodiment 7, further comprising: generating the second PHY data portion according to a first data rate; and generating the padding signal according to a second data rate that is higher than the first data rate.

Embodiment 9

The method of embodiment 8, further comprising: generating, at the communication device, the first PHY data portion according to the second data rate.

Embodiment 10

The method of embodiment 8, further comprising: generating, at the communication device, the first WUR packet PHY sync signal to have a first duration; and generating, at the communication device, the second WUR packet PHY sync signal to have a second duration that is longer than the first duration.

Embodiment 11

A wireless communication device, comprising: a network interface device associated with a first communication device, wherein the network interface device comprises one or more integrated circuit (IC) devices configured to: generate a first portion of a wakeup radio (WUR) packet, wherein the first portion of the WUR packet corresponds to a WLAN legacy PHY preamble of the WUR packet, and generate a second portion of the WUR packet, including: generating the second portion of the WUR packet to include a WUR packet PHY sync signal, wherein the WUR packet PHY sync signal corresponds to a sync bit sequence with each bit in the sync bit sequence modulated by a sync waveform, generating the second portion of the WUR packet to include a PHY data portion, and generating the second portion of the WUR packet to include a padding signal, wherein the padding signal corresponds to a padding bit sequence with each bit in the padding bit sequence modulated by the sync waveform; wherein the network interface device comprises one or more transceivers implemented on the one or more IC devices, the one or more transceivers configured to transmit the WUR packet.

Embodiment 12

The wireless communication device of embodiment 11, wherein the one or more IC devices are further configured to: generate the second portion of the WUR packet to include a padding signal that corresponds to a padding bit sequence that is a sequence of alternating ones and zeros.

Embodiment 13

The wireless communication device of embodiment 12, wherein the one or more IC devices are further configured to: generate the second portion of the WUR packet to include a padding signal that corresponds to a padding bit sequence that is a sequence of alternating ones and zeros that corresponds to a Manchester encoded sequence of all ones.

Embodiment 14

The wireless communication device of embodiment 12, wherein the one or more IC devices are further configured to: generate the second portion of the WUR packet to include a padding signal that corresponds to a padding bit sequence that is a sequence of alternating ones and zeros that corresponds to a Manchester encoded sequence of all zeros.

Embodiment 15

The wireless communication device of any of embodiments 12-14, wherein the one or more IC devices are further configured to: generate the padding signal by modulating each bit in the padding bit sequence with the sync waveform using on-off keying (OOK) modulation.

Embodiment 16

The wireless communication device of any of embodiments 12-15, wherein the one or more IC devices are further configured to: generate the PHY data portion according to a first data rate; and generate the padding signal according to a second data rate that is higher than the first data rate.

Embodiment 17

The wireless communication device of embodiment 16, wherein: the WUR packet PHY sync signal is a first WUR packet PHY sync signal within a first subchannel of a plurality of subchannels; the PHY data portion is a first PHY data portion within the first subchannel; and the one or more IC devices are further configured to: generate the first portion of the WUR packet to span the plurality of subchannels, generate the second portion of the WUR packet to be within the first subchannel among the plurality of subchannels, generate a third portion of the WUR packet to be within a second subchannel among the plurality of subchannels, generate the third portion of the WUR packet to include a second WUR packet PHY sync signal within the second subchannel, wherein the second WUR packet PHY sync signal corresponds the sync bit sequence with each bit in the sync bit sequence modulated by the sync waveform, and generate the third portion of the WUR packet to include a second PHY data portion within the second subchannel.

Embodiment 18

The wireless communication device of embodiment 17, wherein the one or more IC devices are further configured to: generate the second PHY data portion according to a first data rate; and generate the padding signal according to a second data rate that is higher than the first data rate.

Embodiment 19

The wireless communication device of embodiment 18, wherein the one or more IC devices are further configured to: generate the first PHY data portion according to the second data rate.

Embodiment 20

The wireless communication device of embodiment 18, wherein the one or more IC devices are further configured to: generate the first WUR packet PHY sync signal to have a first duration; and generate the second WUR packet PHY sync signal to have a second duration that is longer than the first duration.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating and transmitting a wakeup radio (WUR) packet in a wireless local area network (WLAN), the method comprising:
    generating, at a communication device, a first portion of the WUR packet, wherein the first portion of the WUR packet corresponds to a WLAN legacy PHY preamble of the WUR packet;
    generating, at the communication device, a second portion of the WUR packet, wherein generating the second portion of the WUR packet includes:
    generating the second portion of the WUR packet to include a WUR packet PHY sync signal, wherein the WUR packet PHY sync signal corresponds to a sync bit sequence with each bit in the sync bit sequence modulated by a sync waveform, the sync waveform corresponding to a time-truncated orthogonal frequency division multiplexing (OFDM) symbol with at least two alternating subcarriers set to non-zero power values and subcarriers between the at least two alternating subcarriers set to zero power,
    generating the second portion of the WUR packet to include a PHY data portion, and
    generating the second portion of the WUR packet to include a padding signal, wherein the padding signal corresponds to a padding bit sequence with each bit in the padding bit sequence modulated by the sync waveform; and
    transmitting, by the communication device, the WUR packet.

2. The method of claim 1, wherein:
    generating the second portion of the WUR packet comprises including in the second portion of the WUR packet a padding signal that corresponds to a padding bit sequence that is a sequence of alternating ones and zeros.

3. The method of claim 2, wherein generating the second portion of the WUR packet comprises including in the second portion of the WUR packet a padding signal that corresponds to a sequence of alternating ones and zeros that corresponds to a Manchester encoded sequence of all ones.

4. The method of claim 2, wherein generating the second portion of the WUR packet comprises including in the second portion of the WUR packet a padding signal that corresponds to a sequence of alternating ones and zeros that corresponds to a Manchester encoded sequence of all zeros.

5. The method of claim 2, wherein generating the second portion of the WUR packet comprises including in the second portion of the WUR packet a padding signal that corresponds to a padding bit sequence with each bit in the padding bit sequence modulated by the sync waveform using on-off keying (OOK) modulation.

6. The method of claim 2, further comprising:
    generating the PHY data portion according to a first data rate; and
    generating the padding signal according to a second data rate that is higher than the first data rate.

7. The method of claim 6, wherein:
    generating the first portion of the WUR packet comprises generating the first portion of the WUR packet to span a plurality of subchannels;
    generating the second portion of the WUR packet comprises generating the second portion of the WUR packet to be within a first subchannel among the plurality of subchannels;
    the WUR packet PHY sync signal is a first WUR packet PHY sync signal within the first subchannel;
    the PHY data portion is a first PHY data portion within the first subchannel;
    the method further comprises generating, at the communication device, a third portion of the WUR packet to be within a second subchannel among the plurality of subchannels, wherein generating the third portion of the WUR packet includes:
        generating the third portion of the WUR packet to include a second WUR packet PHY sync signal within the second subchannel, wherein the second WUR packet PHY sync signal corresponds the sync bit sequence with each bit in the sync bit sequence modulated by the sync waveform, and
        generating the third portion of the WUR packet to include a second PHY data portion within the second subchannel.

8. The method of claim 7, further comprising:
    generating the second PHY data portion according to a first data rate; and
    generating the padding signal according to a second data rate that is higher than the first data rate.

9. The method of claim 8, further comprising:
    generating, at the communication device, the first PHY data portion according to the second data rate.

10. The method of claim 8, further comprising:
    generating, at the communication device, the first WUR packet PHY sync signal to have a first duration; and
    generating, at the communication device, the second WUR packet PHY sync signal to have a second duration that is longer than the first duration.

11. A wireless communication device, comprising:
    a network interface device associated with a first communication device, wherein the network interface device comprises one or more integrated circuit (IC) devices configured to:
    generate a first portion of a wakeup radio (WUR) packet, wherein the first portion of the WUR packet corresponds to a WLAN legacy PHY preamble of the WUR packet, and generate a second portion of the WUR packet, including:
generating the second portion of the WUR packet to include a WUR packet PHY sync signal, wherein the WUR packet PHY sync signal corresponds to a sync bit sequence with each bit in the sync bit sequence modulated by a sync waveform, the sync waveform corresponding to a time-truncated orthogonal frequency division multiplexing (OFDM) symbol with at least some two alternating subcarriers set to non-zero power values and subcarriers between the at least some two alternating subcarriers set to zero power,
generating the second portion of the WUR packet to include a PHY data portion, and
generating the second portion of the WUR packet to include a padding signal, wherein the padding signal corresponds to a padding bit sequence with each bit in the padding bit sequence modulated by the sync waveform;
wherein the network interface device comprises one or more transceivers implemented on the one or more IC devices, the one or more transceivers configured to transmit the WUR packet.

12. The wireless communication device of claim 11, wherein the one or more IC devices are further configured to:
generate the second portion of the WUR packet to include a padding signal that corresponds to a padding bit sequence that is a sequence of alternating ones and zeros.

13. The wireless communication device of claim 12, wherein the one or more IC devices are further configured to:
generate the second portion of the WUR packet to include a padding signal that corresponds to a padding bit sequence that is a sequence of alternating ones and zeros that corresponds to a Manchester encoded sequence of all ones.

14. The wireless communication device of claim 12, wherein the one or more IC devices are further configured to:
generate the second portion of the WUR packet to include a padding signal that corresponds to a padding bit sequence that is a sequence of alternating ones and zeros that corresponds to a Manchester encoded sequence of all zeros.

15. The wireless communication device of claim 12, wherein the one or more IC devices are further configured to:
generate the padding signal by modulating each bit in the padding bit sequence with the sync waveform using on-off keying (OOK) modulation.

16. The wireless communication device of claim 12, wherein the one or more IC devices are further configured to:
generate the PHY data portion according to a first data rate; and
generate the padding signal according to a second data rate that is higher than the first data rate.

17. The wireless communication device of claim 16, wherein:
the WUR packet PHY sync signal is a first WUR packet PHY sync signal within a first subchannel of a plurality of subchannels;
the PHY data portion is a first PHY data portion within the first subchannel; and
the one or more IC devices are further configured to:
generate the first portion of the WUR packet to span the plurality of subchannels,
generate the second portion of the WUR packet to be within the first subchannel among the plurality of subchannels,
generate a third portion of the WUR packet to be within a second subchannel among the plurality of subchannels,
generate the third portion of the WUR packet to include a second WUR packet PHY sync signal within the second subchannel, wherein the second WUR packet PHY sync signal corresponds the sync bit sequence with each bit in the sync bit sequence modulated by the sync waveform, and
generate the third portion of the WUR packet to include a second PHY data portion within the second subchannel.

18. The wireless communication device of claim 17, wherein the one or more IC devices are further configured to:
generate the second PHY data portion according to a first data rate; and
generate the padding signal according to a second data rate that is higher than the first data rate.

19. The wireless communication device of claim 18, wherein the one or more IC devices are further configured to:
generate the first PHY data portion according to the second data rate.

20. The wireless communication device of claim 18, wherein the one or more IC devices are further configured to:
generate the first WUR packet PHY sync signal to have a first duration; and
generate the second WUR packet PHY sync signal to have a second duration that is longer than the first duration.

* * * * *